Nov. 21, 1967     A. F. ROMANOWSKI     3,353,710

REMOTE CONTROL APPARATUS FOR DISPENSING

Filed May 12, 1966                      8 Sheets-Sheet 5

Fig. 9

INVENTOR
ALBERT F. ROMANOWSKI
By JEFFERS & YOUNG
Attorneys

Fig. 10A

INVENTOR.
ALBERT F. ROMANOWSKI
by JEFFERS & YOUNG
ATTORNEYS

FIG. 10B

INVENTOR.
ALBERT F. ROMANOWSKI
JEFFERS & YOUNG
ATTORNEYS

ABSTRACT OF THE DISCLOSURE

The apparatus permits a gasoline dispenser to be remotely controlled for either automatic or manual dispensing. In automatic dispensing, the dollar amount is remotely set on the apparatus, and the dispenser is automatically stopped when gasoline representing that dollar amount is dispensed. In manual dispensing, the dispenser is operated manually independently of the apparatus.

---

The invention relates to remote control apparatus for dispensing, and particularly to such apparatus for remotely controlling the quantity of gasoline dispensed from a gasoline dispenser.

With the increasing number of automobiles, and with the increasing shortage of personnel, more gasoline station operators are finding it desirable or expedient to allow the motorist to fill his own tank with gasoline from a dispenser. And, many motorists now service their own automobiles, either to save time or for personal reasons. Where an operator permits motorists to dispense their own gasoline, he must, for safety reasons, maintain good control over the dispensing.

Accordingly, an object of the invention is to provide apparatus which permits gasoline to be remotely dispensed under the control of a station operator.

Another object of the invention is to provide apparatus which permits gasoline to be dispensed by a motorist or unskilled person with safety and under the remote control of the station operator.

For economic reasons, a gasoline station operator must maintain control over the amount of gasoline dispensed by the motorist. This has been difficult to do because the operator has had to watch the amount of gas being dispensed, and stop the dispenser at the proper time, namely when the cost of the gasoline equals the amount paid. Such stopping has been difficult, if not impossible, because the operator may be some distance away from the dispenser being used, or because the operator may have his attention diverted elsewhere.

Accordingly, another object of the invention is to provide remote control apparatus which can remotely turn off a dispenser.

Another object of the invention is to provide remote control apparatus which automatically and remotely stops a dispenser after the predetermined dollar and cent value of gasoline has been dispensed.

Finally, remote control apparatus for dispensing apparatus should be adaptable to the types of dispensers preferred by the operator. That is, an operator may want a separate remote control apparatus for each dispenser, or may want one remote control apparatus to selectively serve a number of dispensers, or may want the dispenser operable without the remote control.

Accordingly, another object of the invention is to provide remote control apparatus which can control one or more dispensers in one or more types of operation.

Briefly, these and other objects are achieved in accordance with the invention by remote control apparatus which can be selectively connected to one of several gasoline dispensers, or which is always connected to only one gasoline dispenser. The remote control apparatus comprises switches which can be pre-set by the station operator to indicate the dollar amount of gasoline to be automatically dispensed. The remote control apparatus also comprises switches which select whether the dispensing is to be automatic or manual. If the remote control apparatus can be connected to more than one dispenser, the remote control apparatus comprises switches to select the dispenser to be controlled. For automatic operation, the remote control apparatus comprises switches which the station operator can set to represent the dollar and cent value of gasoline to be remotely dispensed. The gasoline dispenser is arranged to produce pulses or signals (representing dollars and cents) as the gasoline is dispensed. These pulses are applied to and counted by a counter in the remote control apparatus. For automatic dispensing, the remote control apparatus automatically stops the dispenser in response to the quantity in the counter equaling the quantity set on the pre-set switches. Thus, a station operator can receive cash from a customer for the desired dollar and cent amount of gasoline and pre-set the dollar and cent amount on the switches of the remote control apparatus. Then, the operator can set the remote control apparatus into automatic operation (with a particular dispenser if appropriate), and the customer or attendant can dispense the gasoline in the usual manner. The operator has the assurance that the dispenser will be automatically turned off after the exact dollar and cent amount of gasoline has been dispensed. In addition, the remote control apparatus can be set for manual operation to permit the operator or his attendant to dispense as much gas as desired, such as for a customer who wants his tank completely filled. And finally, in all cases, the remote controlled apparatus has a switch for stopping the dispensing at any time, such as if a safe practice is being violated.

The scope of the invention is pointed out in the claims. The invention may be better understood from the following description given in connection with the accompanying drawing, in which:

In the following description, the remote control apparatus of the invention will first be generally described, then will be described in detail, and then the operation of the remote control apparatus will be described.

General description

Figure 1:
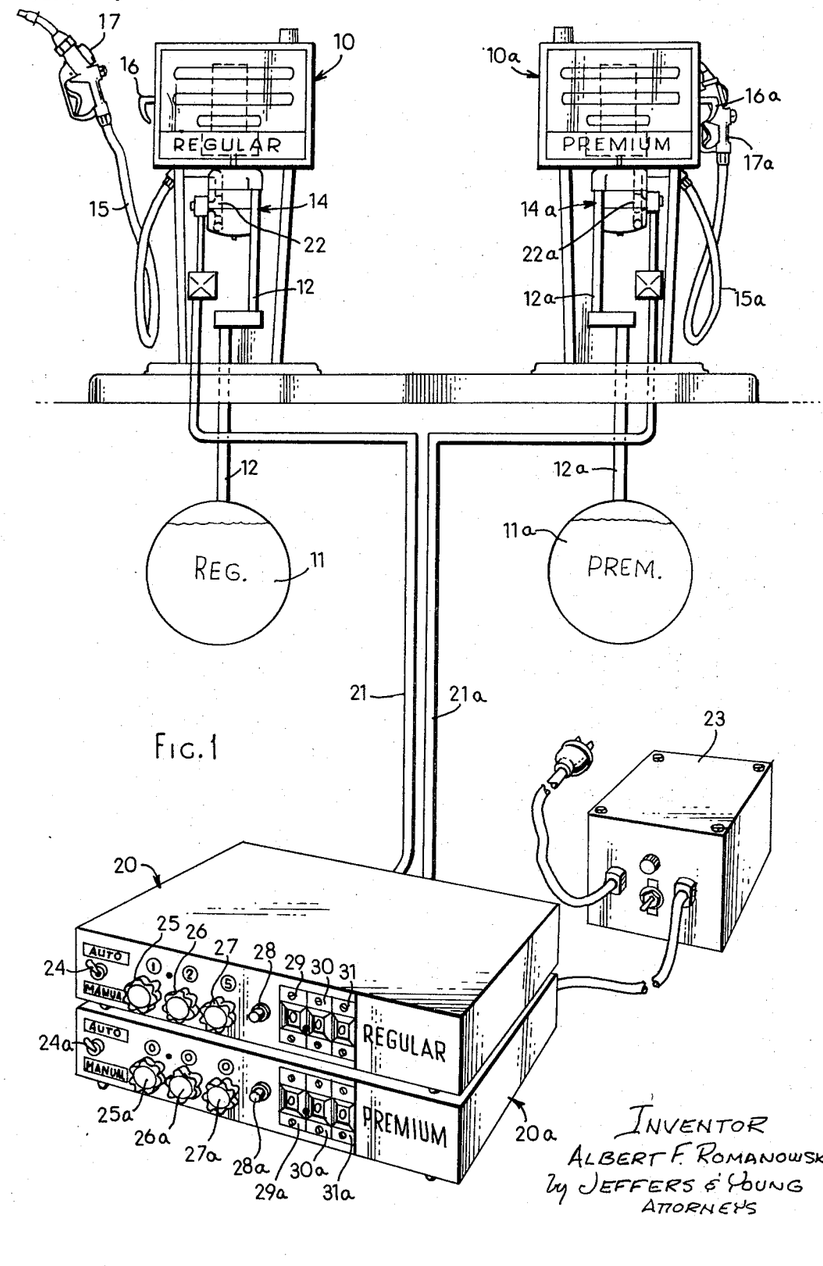
FIGURE 1 shows a perspective view of two gasoline dispensers and two corresponding remote control apparatus in accordance with the invention.

FIGURE 1 shows two dispensers 10, 10a for dispensing a regular and premium grade of gasoline stored in tanks 11, 11a. These dispensers 10, 10a are respectively connected to remote control apparatus 20, 20a. Except for the quality and cost of the gasoline, the two dispensers and associated apparatus are substantially identical, so that only the regular dispenser 10 and its apparatus will be explained. The explanation for the premium dispenser 10a would be substantially identical, with the reference numerals having the suffix a. The regular gasoline is conveyed or pumped from a tank 11 to the dispenser 10 by a pump (not shown) which pumps the gasoline through a pipe 12, through metering apparatus 14, through a solenoid valve 22, and to a hose 15 and nozzle 17. The nozzle 17 is supported (when not in use) by a handle 16 which, as in many known dispensers, operates a switch for controlling the pump in or associated with the tank 11.

The apparatus described thus far is known in the art. In accordance with the invention, the remote control apparatus 20 is provided for the dispenser 10. The apparatus 20 is electrically connected by a suitable cable or conduit 21 to the regular dispenser 10. These connections include, among other things, the solenoid valve 22 which, under control of the apparatus 20, can be operated to permit or prevent gas from being dispensed. Both remote control apparatus 20, 20a are supplied with suitable alternating and direct current power from a power supply 23 which may be operated from conventional 115 volt, 60 cycle alternating current. The apparatus 20 has an automatic-manual switch 24 for providing automatic control of the dispenser 10, or for providing manual control of the dispenser 10. The apparatus 20 has a dollar selector switch 25, a ten cent selector switch 26, and a one cent selector switch 27. Each of these switches 25, 26, 27 is a ten position rotary switch which is turned or set by the station operator to set or limit the dollar and cent amount of gasoline which will be automatically dispensed from the dispenser 10. The switches 25, 26, 27 may have respective indicators (as shown) positioned above them to assure the station operator that he has set each switch for the correct amount. As an example, the apparatus 20 has the selector switches set for $1.25. Further, the apparatus 20 has a set of indicators, specifically a dollar indicator 29, a ten cent indicator 30, and a one cent indicator 31. Each of these indicators 29, 30, 31 is a ten position stepping switch which is connected through the cable 21 to the dispenser 10 to indicate the dollar and cent amount dispensed at any given instant or time. The indicators 29, 30, 31 are reset by a reset push button switch 28.

Figure 2:
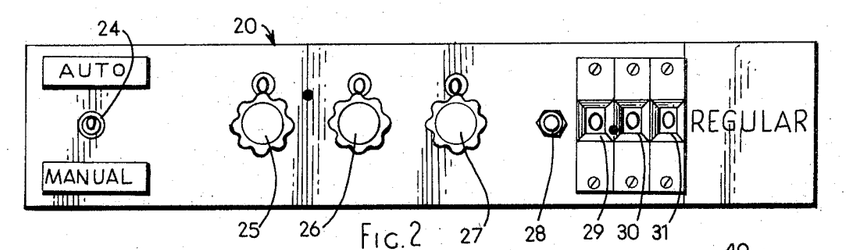
FIGURE 2 shows a front view of one of the remote control apparatus in FIGURE 1.
Figure 4:
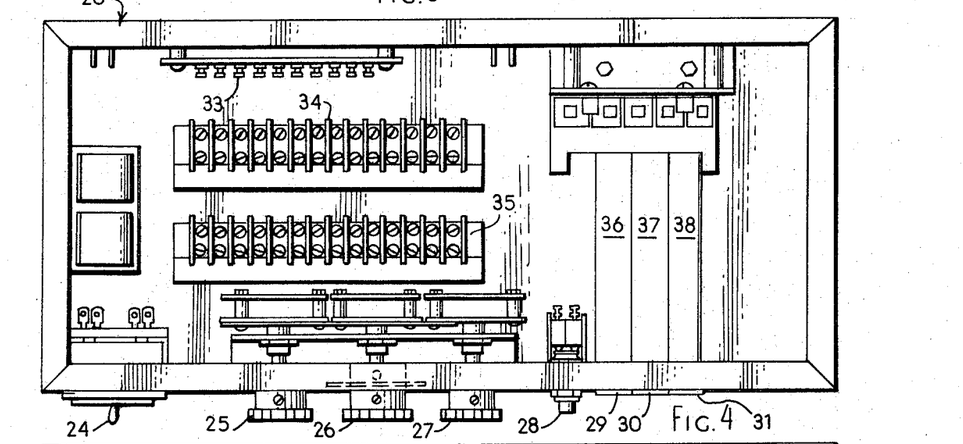
FIGURE 4 shows an internal plan view of a remote control apparatus in accordance with the invention.
Figure 5:
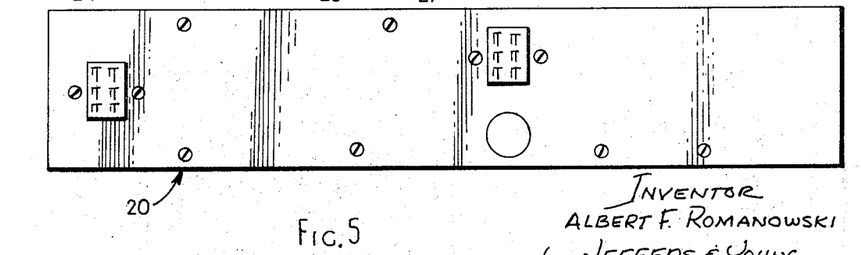
FIGURE 5 shows a rear view of a remote control apparatus in accordance with the invention.

FIGURE 2 shows a front elevation view of the regular remote control apparatus 20 shown in perspective in FIGURE 1. In FIGURE 2, it will be noted how the automatic-manual switch 24 can be readily switched to the automatic position or the manual position. The switch 24 also has a center position in which it is shown. When the switch 24 is in this center position, the dispenser 10 associated with the apparatus 20 is turned off. Also, it will be seen how the selector switches 25, 26, 27 can be easily set to the desired dollar and cent amount. And finally, it will be seen how the dollar and cent amount dispensed is well displayed for easy viewing on the indicators 29, 30, 31. FIGURE 4 shows a top plan view of the remote control apparatus 20 with the top cover removed. FIGURE 4 shows the actual location of the automatic-manual switch 24, and also the location and position of the selector switches 25, 26, 27. The apparatus 20 includes a number of terminal strips or boards 33, 34, 35 to connect the various elements of the apparatus 20 to one another, or to make them accessible to external connections. FIGURT 4 also shows indicator apparatus 36, 37, 38 associated with the dollar, ten cent, and one cent indicators respectively 29, 30, 31 for converting electrical signals to a visible indication of the dollar and cent amount of the gasoline dispensed. FIGURE 5 shows a rear elevation of the apparatus 20, and shows connectors for connecting the internal elements of the apparatus 20 to the cable or conduit shown in FIGURE 1.

As an example for explaining the operation of the apparatus shown and described thus far, it is assumed that a customer has given the station operation $1.25 for a purchase of regular gasoline. As shown in FIGURE 1, the station operator sets the dollar selector switch 25 to one, the ten cent selector switch 26 to two, and the one cent selector switch 27 to five. The automatic-manual switch 24 is thrown to the automatic position, and the switch 28 is pushed to reset the indicators 29, 30, 31. Either or both of these switches 24, 28 may close a circuit to indicate to the customer that he may begin to dispense gasoline. In any case, the customer removes the nozzle 17 from the handle 16, and dispenses or begins to dispense gasoline from the regular dispenser 10 into his car or other container. As he does so, suitable indicators on the face of the dispenser 10 can tell the customer or motorist the quantity and dollar and cent amount of gasoline he has dispensed. The indicators 29, 30, 31 tell the station operator the dollar and cent amount that the customer or motorist has dispensed. When the dollar and cent amount indicated by the indicators 29, 30, 31 reaches $1.25, the dispenser 20 automatically through circuits and apparatus to be described, stops the dispenser 10 from dispensing further gasoline. When this happens, the customer knows, as indicated on the indicators of the dispenser 10, that he has received the quantity of gasoline covered by his purchase. And, the station operator may be attending to other matters with the knowledge that the remote control apparatus 20 will stop this dispensing at the proper time. Thereupon, the motorist or customer can replace the nozzle 15, and leave. Thus, the station operator has accurately sold a predetermined quantity of gasoline covered by a cash payment without having to actually dispense the gasoline himself. As will be described, the station operator my position the automatic-manual switch 24 in the manual position so that the dispenser 10 can be operated directly and dispense as much gasoline as desired. Such manual dispensing might be appropriate in certain instances, as where business was slack or where a customer wanted to purchase a full tank of gasoline.

Figure 3:
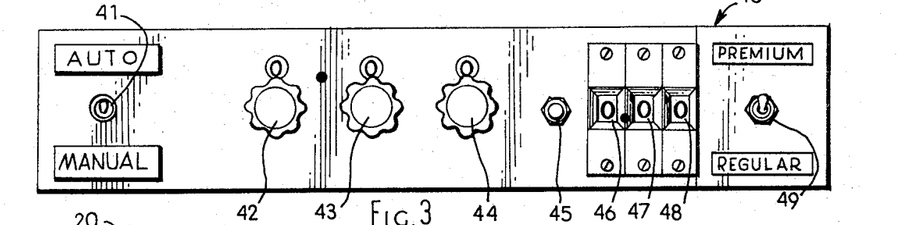
FIGURE 3 shows a front view of a remote control apparatus in accordance with the invention which can selectively control one of two dispensers.

FIGURE 3 shows a modification of the invention in the form of a single remote control apparatus 40 which can be used with two dispensers, such as the dispensers 10, 10a in FIGURE 1. The apparatus 40 is similar to the apparatus 20 shown and described in connection with FIGURES 1, 2, 4, and 5. The apparatus 40 comprises the automatic-manual switch 41, the dollar, ten cent, and one cent selector switches 42, 43, 44, a reset switch 45 for the indicators, and the dollar, ten cent, and one cent indicators 46, 47, 48. In addition, the remote control apparatus 40 comprises a premium-regular selector switch 49 (having two portions, as will be explained) which can be thrown to one of two positions and thereby connect the apparatus 40 to either the regular dispenser 10 or the premium dispenser 10a. It is to be understood that the selector switch 49 may have additional positions if the single apparatus 40 is to be used with additional dispensers.

Detailed description

Figure 6:
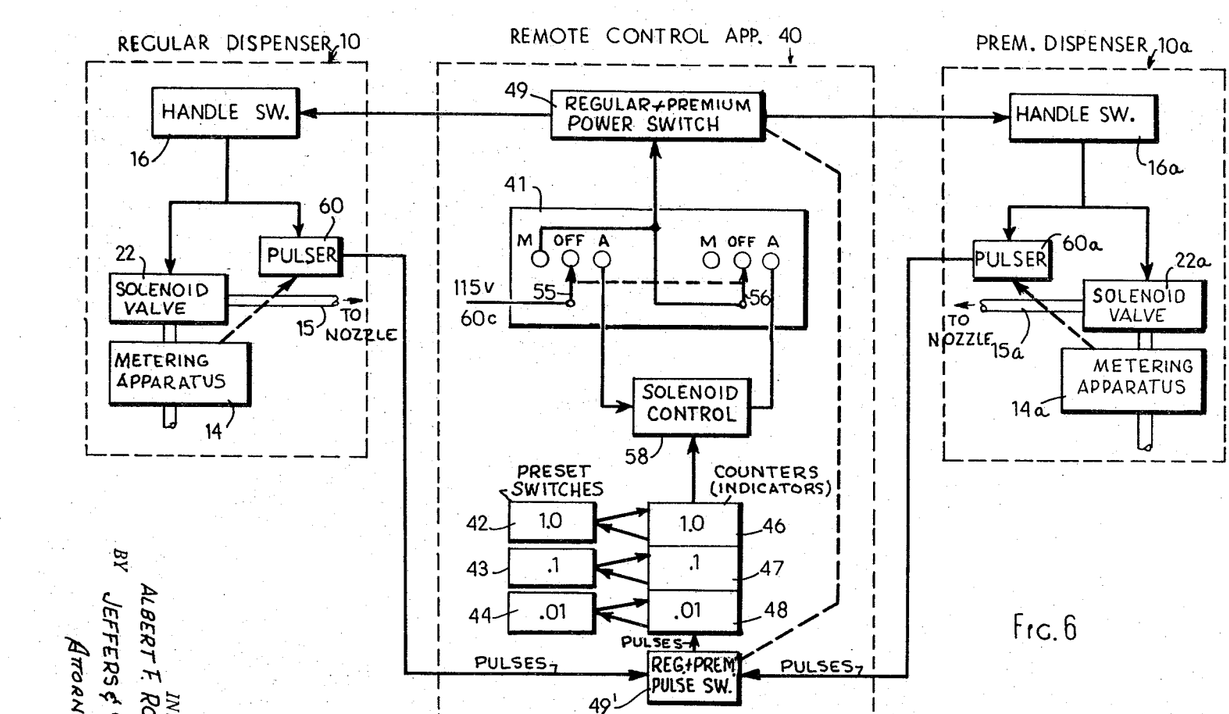
FIGURE 6 shows a block electrical diagram of one embodiment of a remote control apparatus in accordance with the invention which can selectively control one of two gasoline dispensers.

FIGURE 6 shows an electrical block diagram of the remote control apparatus 40 for use with the regular and premium dispensers 10, 10a shown in FIGURE 1. The apparatus 40 has been selected for detailed description since it contains the additional elements for permitting the apparatus 40 to be used with more than one dispenser, whereas each of the two apparatus 20, 20a of FIGURE 1 is intended to be used with only one dispenser, and hence does not have the additional features utilized in the apparatus 40.

The apparatus 40 comprises the automatic-manual selector switch 41 which, as illustrated, comprises two movable contacts or poles 55, 56 which are operated together between contacts of a manual position M, contacts of an off position, and contacts of an automatic position A. If the switch 41 is thrown to the manual position, power (in this case 115 volts, 60 cycles) is applied directly to the regular-premium power switch portion 49. In this condition, the selected dispenser can be manually operated in conventional fashion. If the switch 41 is thrown to the automatic position, power must flow through a solenoid control 58 in order to reach the power switch portion 49. The solenoid control 58 provides this completed circuit so long as a count control signal is in a permissive condition and permits it to do so. The count control signal is switched to the inoperative or blocking condition when the count in the counters or indicators 46, 47, 48 reaches the amount in the preset switches 42, 43, 44. This condition is reached when the dollar and cent value of gasoline dispensed equals the dollar and cent value set on the preset switches. Under this condition, an appropriate blocking signal is provided which opens the solenoid control 58 and, with the switch 41 in the automatic position, removes power from the power switch portion 49. This switch also has a regular-premium pulse switch portion 49 which is operated by the same switch handle. Depending on its position, the pulse switch portion 49′ connects pulses from either the regular dispenser 10 or the premium dispenser 10a to the counters or indicators 46, 47, 48. The switch portions 49, 49′ are connected so that when in the regular position (see FIGURE 3), power can be supplied to the regular dispenser 10 and the control apparatus 40 receives pulses from the regular dispenser 10. When the switch portions 49, 49′ are in the premium position, the apparatus 40 can supply power to the premium dispenser 10a and can receive pulses from the premium dispenser 10a. The metering and control apparatus 14, 14a of the two dispensers shown in FIGURE 1 are connected to the solenoid valves 22, 22a as previously mentioned. The solenoid valves 22, 22a are coupled between the apparatus 14, 14a and the hoses 15, 15a for controlling the gasoline flow to the nozzles 17, 17a. When the solenoid valves 22, 22a of the dispensers 10, 10a are respectively energized, gasoline may flow from the respective pumps and pipes 12, 12a, through the metering apparatus 14, 14a, and the respective nozzles 17, 17a.

Figure 7:
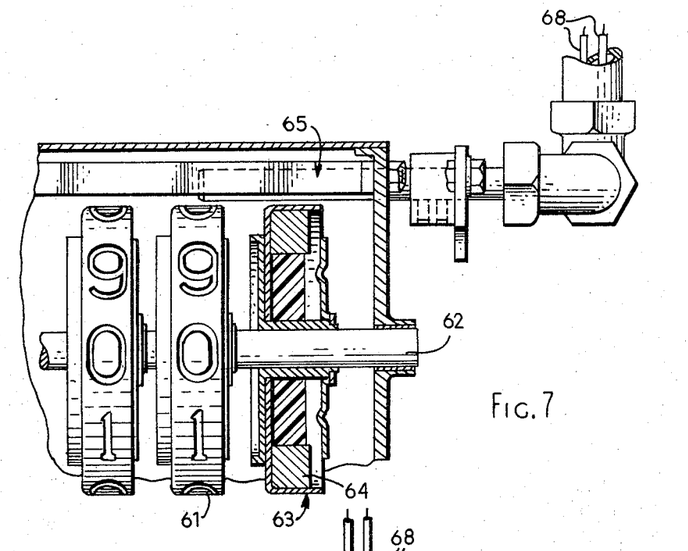
FIGURES 7 and 8 show front and side elevation views of a pulser for use with the remote control apparatus of the invention.
Figure 8:
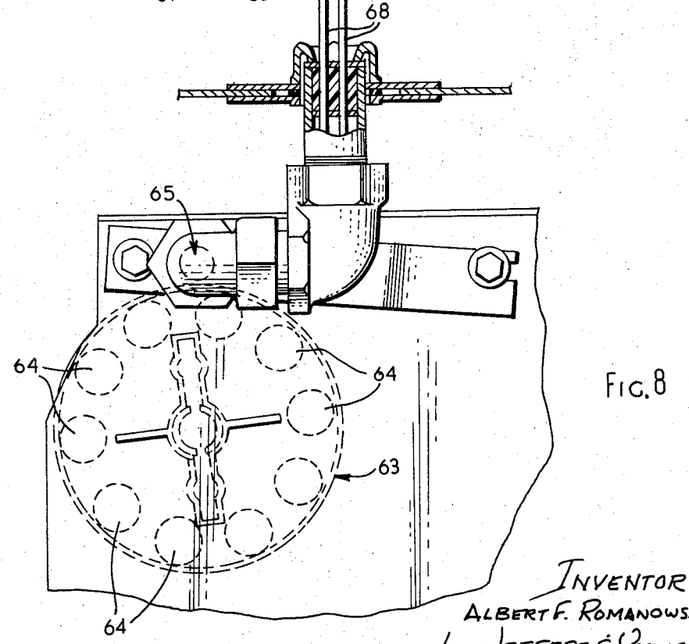
Figure 9:
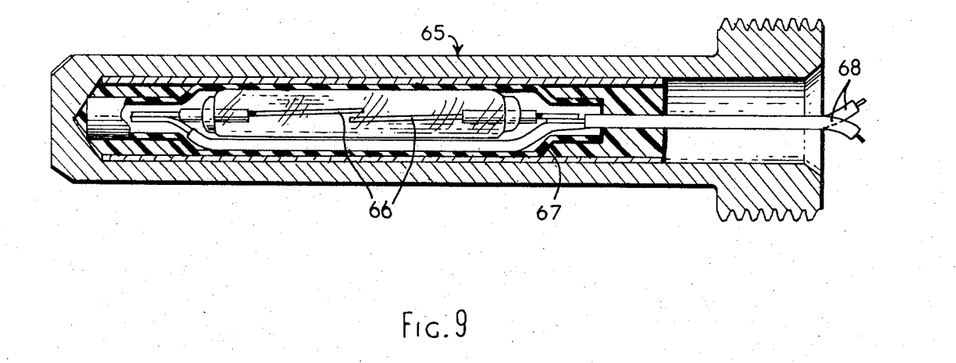
FIGURE 9 shows a longitudinal cross-sectional view of a reed relay which can be used in the pulser of FIGURES 7 and 8; and, FIGURES 10A, 10B, and 10C show a more complete electrical diagram of the remote control apparatus shown in block diagram in FIGURE 6.

Connected at some appropriate point to either the pipes 12, 12a or to pipes between the hoses 15, 15a and the solenoid valves 22, 22a are respective pulsers 60, 60a, which produce one pulse for each one cent of gasoline dispensed by the respective dispensers 10, 10a. In FIGURE 6, the connections for the pulsers 60, 60a are indicated by dashed lines. Actually, as shown in FIGURES 7 and 8, each of these pulsers may be operated by the respective dispenser one cent indicating wheel 61 and its associated shaft 62. Since such an indicating wheel is, in most instances, already present on a dispenser, the pulser is easily provided. The pulser comprises a pulser wheel 63 which is attached to and which rotates with the one cent wheel shaft 62. The pulser wheel 63 includes ten permanent magnets 64 spaced equally on a circle about the pulser wheel 63. Since the magnets 64 provide an operating function for the pulser, it is preferable that the pulser wheel 63 be constructed of any suitable light weight and non-magnetic material. A suitable reed switch 65 is positioned at an appropriate point adjacent the circumference of the pulser wheel 63 in operative relationship to the permanent magnets 64. As shown in FIGURE 9, the reed switch 65 comprises a pair of normally open contacts 66 which are housed in a suitable container 67 and provided with suitable leads 68 for connection to an external circuit. The contacts 66 of the switch 65 are closed each time one of the permanent magnets 64 passes by the contacts 66, after which the contacts open. The reed switch 65 is suitably housed in appropriate conduits and other structures to reduce the possibility of an open electrical spark. Thus, each time a permanent magnet 64 passes by the reed switch 65, a pulse, in the form of an electrical circuit being closed and subsequently opened, is provided for the remote control apparatus 40 of FIGURE 6. By a corresponding and appropriate configuration of the permanent magnets 64 relative to the one cent wheel on the existing indicator of the dispenser, one such pulse is provided for each one cent of gasoline dispensed by the dispenser.

Figure 10A:
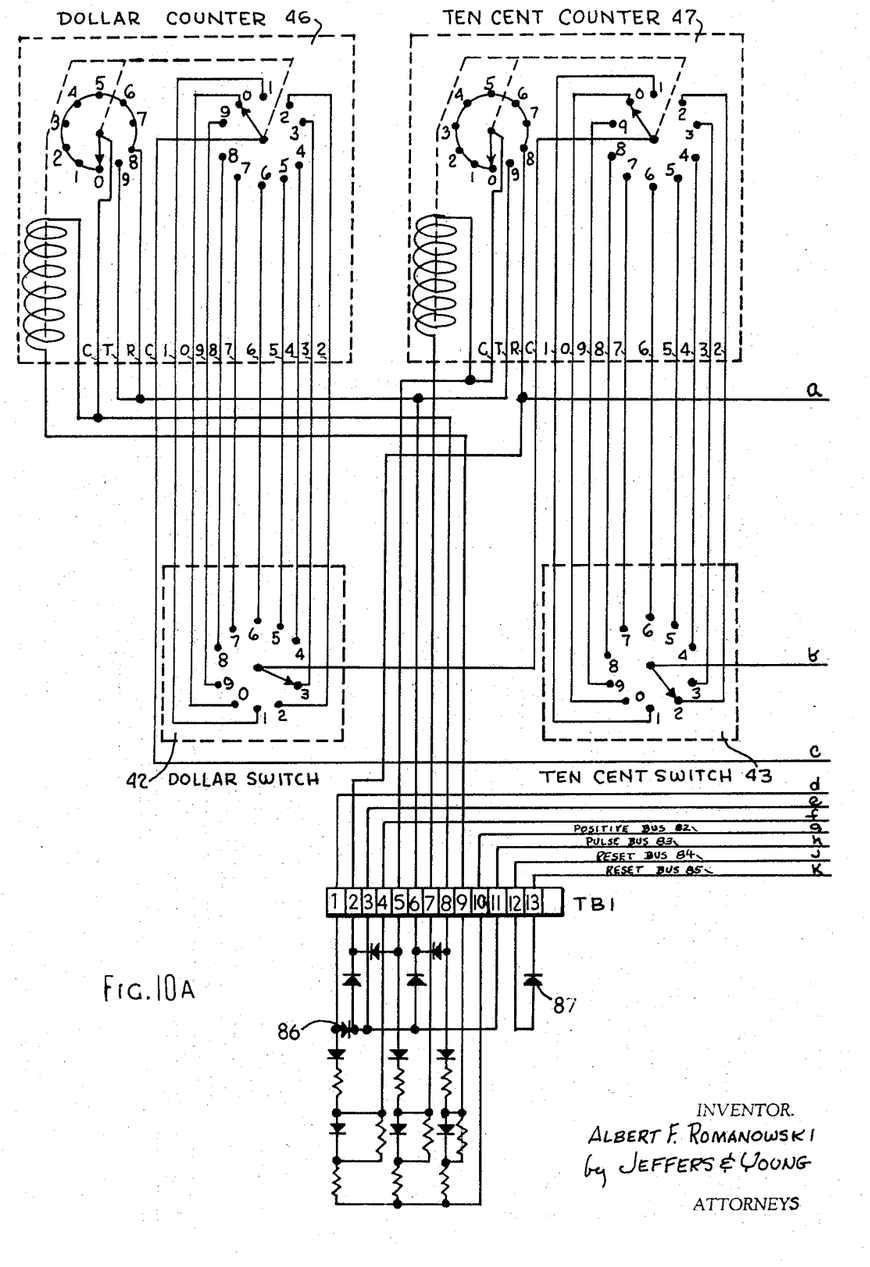
Figure 10B:
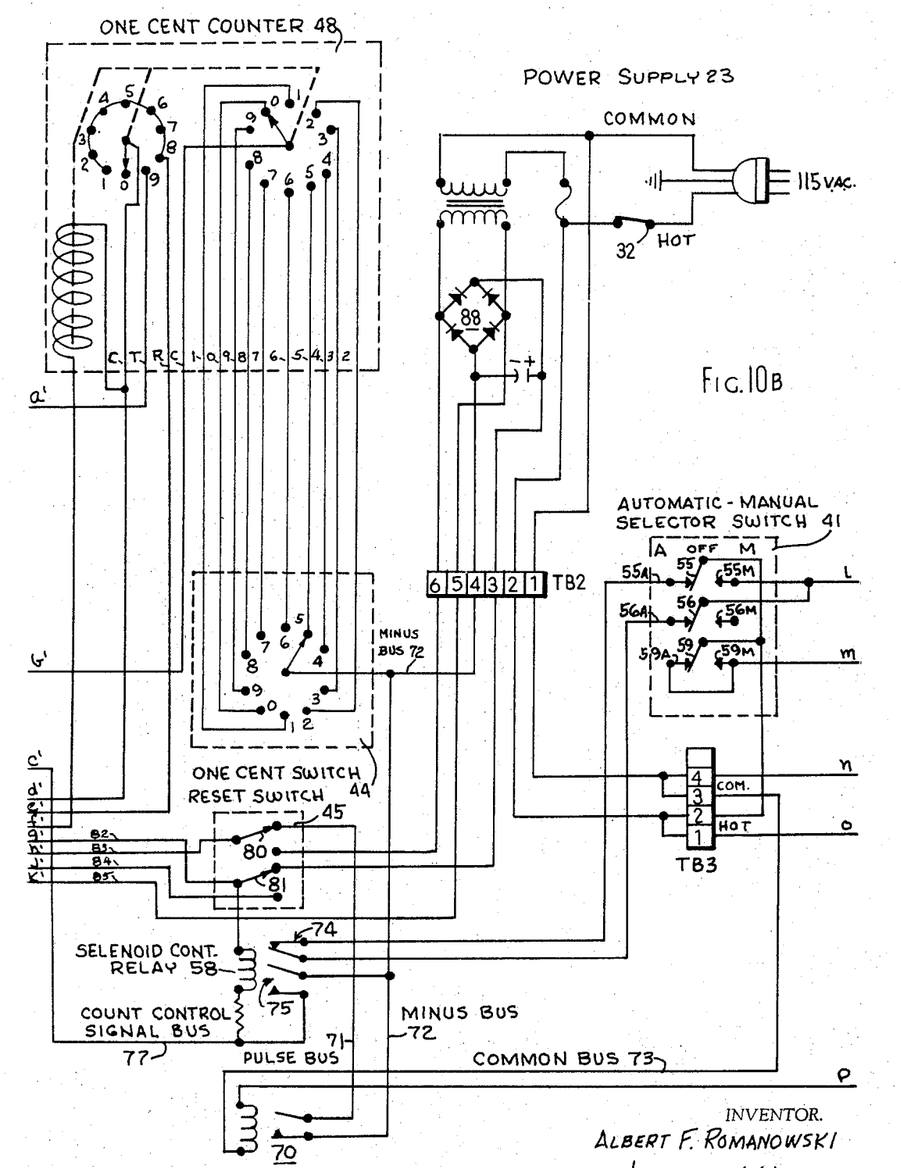
Figure 10C:
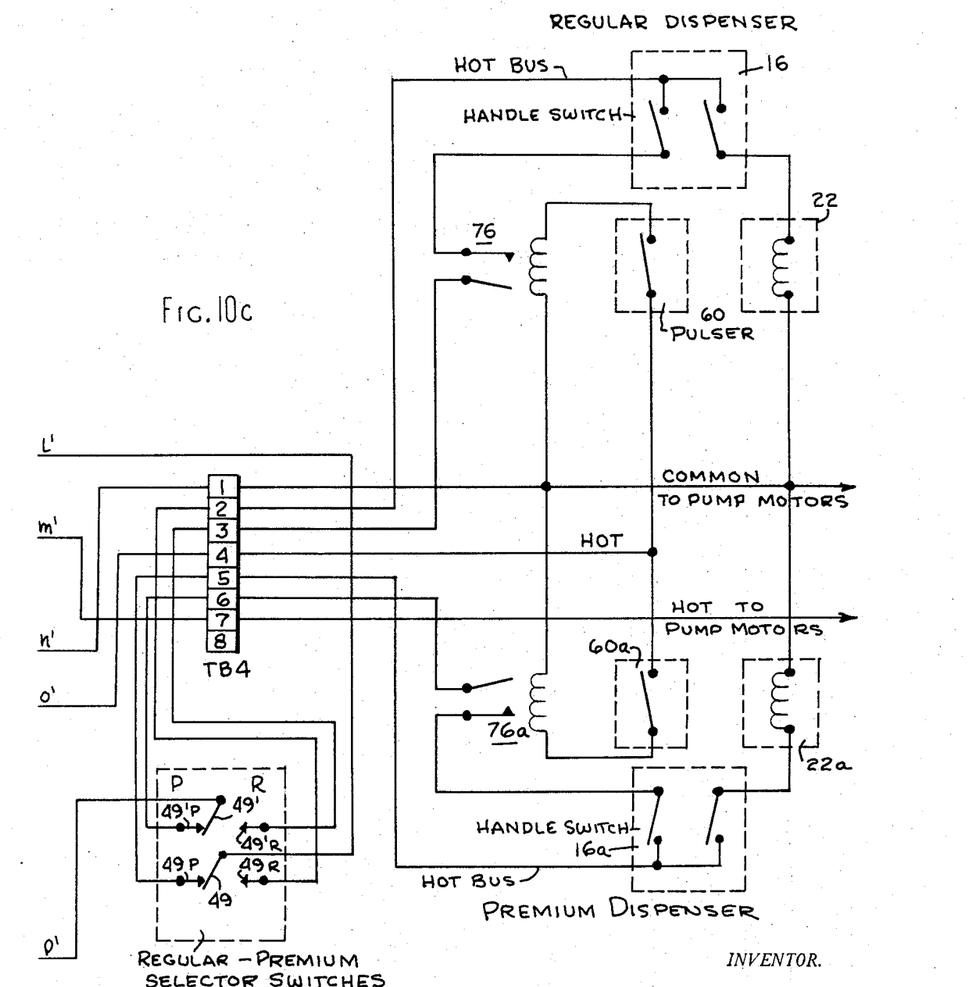

FIGURES 10A, 10B, and 10C show a more complete electrical schematic diagram of the remote control apparatus shown in block diagram form in FIGURE 6. FIGURE 10A is to be considered connected to FIGURE 10B through leads $a$ through $k$, and FIGURE 10B is to be considered connected to FIGURE 10C through leads $l$ through $p$. Corresponding parts in FIGURES 6 and 10 have been given the same reference numerals. As shown in FIGURE 10B, the power supply 23 provides suitable alternating current, suitable reduced voltage alternating current, by a transformer, and suitable direct current by a rectifier and filter 88. This power is applied to a terminal board TB-2 for distribution to the apparatus. The apparatus includes the automatic-manual selector switch 41 which, as shown in FIGURE 10B, includes two movable contacts 55, 56, as well as an additional set of contacts 59, all having associated automatic and manual contacts A and M. The circuit also comprises the selector switches having the power portion 49 and the pulse portion 49′ as shown in FIGURE 10C. The dispensers include the handle switches 16, 16a, the solenoid or solenoid control valves 22, 22a, and the pulsers 60, 60a which are connected to the apparatus through a terminal board TB-4. The pulses are actually connected into the circuit through a pulse relay 70, shown in FIGURE 10B, having a set of movable contacts connected between a pulse bus 71 and a direct current minus bus 72. The reset switch 45 has a first movable contact 80, that normally connects a pulse bus 83 to the pulse bus 71, but that connects the pulse bus 83 to an alternating current line on terminal 6 of terminal board TB-2 on being reset. The second movable contact 81 of the reset switch 45 normally connects the positive bus 82 to the positive direct current at terminal 3 of terminal board TB-2, but that connects this bus 82 to reset bus 84 on being pushed to the reset position. The buses 82, 83, 84, 85 are connected to terminals 10, 11, 12, and 13 of terminal board TB-1 shown in FIGURE 10C. The terminal board TB-1 includes a resistor-diode network which functions with the preset switches 42, 43, 44 and the counters 46, 47, 48 as will be explained. Each of the preset switches 42, 43, 44 includes a movable arm and ten positions 0 through 9 as indicated. Each of the counters 46, 47, 48 includes a transfer and reset contacts having a movable arm and ten positions (on the left), and indicator contacts having a movable arm and ten positions (on the right). The counters also include an operating or actuating coil, and may be conventional stepping switches wired as shown.

The remote control apparatus 40 shown in FIGURE 6 is, by means of the switch portions 49, 49′, able to operate selectively with one of two dispensers 10, 10a. It is to be understood that this remote control apparatus 40 can be used with only a single dispenser, or can be used with three or more dispensers by appropriate permanent connections or switches. In any embodiment, the remote control apparatus 40 may have the manual-automatic switch 41 which permits gasoline to be manually dispensed or to be automatically dispensed in accordance with the preference of the station operator.

*Operation*

As an example of automatic operation, it has been assumed that the remote control apparatus 40 shown in FIGURES 3, 6, and 10 is to be used in a gasoline station, and that a customer wishes to make a purchase of $3.25 of premium gasoline. On being paid, or on making an appropriate notation, the station operator sets the preset switches 42, 43, 44 to indicate $3.25 worth of regular gasoline. He does this by setting the dollar switch 42 at three, the ten cent switch 43 at two, and the one cent switch 44 at five. The automatic-manual switch 41 is thrown to the automatic position A, and the switch portions 49, 49′ are thrown to the premium position P. Thus, the preset dollar value of $3.25 has been placed in the apparatus 40, the apparatus 40 set for automatic operation, and the apparatus 40 connected to the regular dispenser 10. The station operator closes the switch 32 and resets the counters or indicators 46, 47, 48 by pushing the reset switch 45. FIGURES 10A, 10B, and 10C show this condition in the various circuit components. In this condition, the hot side of the 115 volt alternating current power is connected through terminal 2 of terminal board TB–2, terminal 2 of terminal board TB–3, contact 59, terminal 7 of terminal board TB–4 to the gasoline pump motors so that pressure is provided for supplying the gasoline. Power is also supplied from terminal 2 of terminal board TB–3 through contacts 55 and 55A, the closed contacts 74 of the solenoid control relay 58, contacts 56 and 56A, contacts 49 and 49P of the selector switches, terminal 5 of terminal board TB–4 to the handle switch 16a. When the handle switch 16a is closed, the solenoid valve 22a is energized so that when the nozzle valve is operated, gasoline may flow. When gasoline does flow, the contacts of the pulser 60a open and close to energize the winding of a relay 76a and open and close its associated contacts. This alternately places power on and removes power from terminal 6 of terminal board TB–4, and this power passes through contacts 49′P and 49′, through the winding of a pulse relay 70, through the common bus 73, and back to the common terminal 3 of terminal board TB–3. This energization of the winding of the relay of the pulse relay 70 opens and closes its respective contacts to alternately connect and disconnect the pulse bus 71 and the minus bus 72. It will be recalled that the pulse bus 71 is connected through the contacts 80 of the reset switch 45 to the pulse bus 83. Thus, each operation of the pulser 60a connects the direct current minus bus 72 through the pulse bus 83 to terminal 11 of terminal board TB–1 in FIGURE 10A.

Terminal 11 of board TB–1 is connected through a diode rectifier 86 to terminal 1 of terminal board TB–1, and terminal 1 is, in turn, connected to the operating winding of the one cent counter 48. The other side of this operating winding is connected to terminal 4 of terminal board TB–1, which in turn is connected through a resistor network to terminal 10 and the positive bus 82. Thus, each pulse serves to provide a direct current energizing circuit for the winding of the one cent counter. Each such pulse causes the respective transfer and reset switch and the indicator switch to step one position in a clockwise direction from its zero position.

When, after nine pulses, the transfer and reset arm of the one cent counter 48 reaches the terminal 9, it connects the pulse bus 83 to its transfer terminal T. This transfer terminal T is connected to the reset terminal R of the transfer and reset switch of the ten cent counter 47. This reset terminal R is connected to the contact zero through the contact 8, and hence is connected to the movable arm of the transfer and reset switch of the ten cent counter 47. This movable arm is, in turn, connected to the winding of the ten cent counter 47. The other side of this winding is connected to terminal 7 of terminal TB–1. Terminal 7 is connected through a network to terminal 10 and the positive bus 82. Thus, on the next or tenth pulse, the energizing winding of the ten cent counter receives one pulse. This moves its contacts to position 1. At the same time, this same tenth pulse moves the contacts of the one cent counter 48 to position 0. Thus, no further pulses can reach the ten cent counter 47 until the one cent counter 48 reaches position 9 again, after which an additional pulse will cause the ten cent counter 47 to move to its second position. This continues for multiples of 10 pulses until the ten cent counter 47 reaches its position 9 (a total of 90 pulses). This sets up an energizing circuit for the winding of the dollar counter 46, and after 10 more pulses have been applied to the one cent counter, an energizing pulse passes through the one cent counter to the 10 cent counter, through the ten cent counter to the dollar counter 46 and causes the dollar counter 46 to step to its first position.

This stepping continues, with each 10 pulses stepping the one cent counter a complete revolution, and causing the ten cent counter to step one position, and each ten steps of the ten cent counter causing the dollar counter to step one position. As long as the counters or indicators 46, 47, 48 have a count that differs from the value in the preset switches 42, 43, 44, a permissive or count control signal is applied to the solenoid control relay 58 so that power continues to be supplied to the power switch portion 49 and to the premium dispenser. However, as soon as the counters 46, 47, 48 have a dollar and cent value or an electrical value equal to the dollar and cent value or electrical value established by the preset switches 42, 43, 44, a blocking or cut-off signal is produced. This blocking or cut-off signal operates on the solenoid control 58 and de-energizes or opens this control so that power is removed from the power switch portion 49 and the dispenser 10. With the power so removed, the solenoid valve 22a closes and the dispensing of gasoline stops. Thus, the dispensing of the gasoline has been automatically controlled and stopped at the preset dollar and cent amount set by the station operator. Thus, after 325 pulses, the dollar counter will indicate or be in its three position, the ten cent counter 47 will be in its two position, and the one cent counter 48 will be in its five position. This completes a circuit which energizes the winding of the solenoid control relay 58 of FIGURE 10B. This circuit is provided as follows: From the positive terminal 3 of terminal board TB–2, through the contacts 81 of the reset switch 45, through the winding of the solenoid control relay 58, through the count control signal bus 77, through the indicator arm of the dollar counter 46 to position three, through the arm of the dollar switch 42, through the indicator arm of the ten cent counter 47 to position two, through the arm of the ten cent switch 43, through the indicator arm of the one cent counter indicator to position five, through the arm of the one cent switch 44, back to the minus bus 72. When the solenoid control relay 58 winding is energized, the contacts 75 close to connect the count control signal bus 77 directly to the minus bus 72 to hold the winding energized and seal in the relay 58. At the same time, the contacts 74 immediately open and remove power (supplied by contacts 55, 55A and terminal 2 of terminal board TB–3) from the contacts 56A and 56. This removes power from terminal 5 of terminal board TB–4 so that the solenoid 22a is de-energized. Thus, the prescribed dollar and cent value of gasoline has been dispensed, followed by a closing of the solenoid valve 22a.

After this dispensing takes place, the station operator may reset the counters to their zero position by operating the reset switch 45. This connects the alternating current of terminal 6 of terminal board TB–2 through the contacts 80 to the pulse bus 83. Positive half cycles of the alternating current pass through terminal 11 of terminal board TB–1, and are applied to terminals 2, 3, and 6 of terminal board TB–1. Terminal 2 is connected to position 9 of the transfer and reset switch of the one cent counter 48, and to positions 0 through 8 of the transfer and reset switch of the ten cent counter 47. Terminal 3 is connected to positions 1 through 8 of the transfer and reset switch of the one cent counter 48. And terminal 6 is connected to position 9 of the transfer and reset switch of the ten cent counter 47, and to positions 0 through 9 of the transfer and reset switch of the dollar counter. Thus, for any position (with the exception of the zero position of the one cent counter 48), the movable arms of the transfer and reset switches of each of the counters 46, 47, 48 receive direct current. This direct current is, in turn, connected to one side of the respective windings, the other sides of which are connected to terminals 9, 7, and 4 of the terminal board TB–1. These terminals 9 and 7 and 4 are connected through a resistor network to terminal 10 which, in turn, is connected to the positive bus 82. The positive bus 82 is connected through the contacts 81 (with the reset switch 45 in the reset position) to the reset bus 84 which is connected through terminal 12, a rectifier 87, and terminal 13 of terminal board TB–1 to the reset bus 85. The reset bus 85 is connected to the other alternating current line on terminal 5 of terminal board TB–2. Thus, half-wave recified power is applied to each of the windings in a reverse direction which serves to reset the counters 46, 47, 48 to their zero or home position. Thus, the counters are then ready to receive additional pulses. When the counters 46, 47, 48 are returned to their home positions, this removes the negative connection from the count control signal bus 77 so that the winding of the solenoid control relay 58 is deenergized and this relay is in ready to connect power through its now closed contacts 74 to the automatic-manual selector switch 41 for the automatic operation.

It will be noted that when the automatic-manual selector switch 41 is in the manual position, the pulse circuit is still operative, and the counters 46, 47, 48 will indicate or count. Normally, this has no significance, but additional switches may be connected to these counters to provide a totalling function if desired.

Thus, it will be seen that as gasoline is dispensed in the automatic position or type of operation, one pulse is produced for each one cent of gasoline dispensed. These pulses are coupled by the circuit described to the counters or indicators 46, 47, 48. A corresponding type of operation could be or would be provided if the premium regular selector switches were thrown or positioned to the regular position.

After this dispensing of gasoline, the operator may accept another purchase of gasoline, or may set the apparatus 40 for a manual operation to dispense gasoline himself. In the manual operation, power is supplied directly by contacts 55M and 59M to the power contacts 49 and to the pump motors. Resetting of the control apparatus 40 is necessary for the automatic operation before a subsequent automatic dispensing can begin. This feature is provided so that a previous count in the indicators 46, 47, 48 cannot be accrued and/or added to a subsequent count, thereby assuring proper dispensing for each customer. Or, this resetting may be done through an appropriate circuit provided by the handle switches 16, 16a on the dispensers 10, 10a. In addition, a further set of counters may be provided which provide an accumulated dollar and cent total. In any case, a resettable set of counters is desirable for the automatic operation to insure the stopping of the dispensing after the preset dollar and cent value.

It will thus be seen that the remote control apparatus of the invention permits gasoline to be remotely dispensed by a customer and automatically stopped when a preset dollar and cent value, set by the station operator, has been reached. In addition, the remote control apparatus can be used in a manual type of operation if desired. Further, the remote control apparatus can be selectively used with any one of a number of gasoline dispensers. Persons skilled in the art will appreciate that modifications of the invention may be made. For example, a different form of preset switches and counters or indicators may be used with a comparison circuit for deriving the count control signal that permits dispensing, and for deriving the blocking signal to stop dispensing when the comparison circuit indicates the present value and the counted value are equal. And, other types of pulsers can be provided. However, a simple relay that provides a simple closed circuit in the vicinity of the dispenser 10 is preferred for safety reasons. In addition, the base of one cent counting increments may be changed to any value, such as five cents, ten cents, twenty-five cents, or other suitable values, depending upon the type of operation the station operator prefers. Therefore, while the invention has been explained in connection with a particular embodiment, it is to be understood that modifications may be made without departing from the spirit of the invention or from the scope of the claims.

What I claim as new and desire to secure by Letters Patent of the United States is:

1. Apparatus for remotely controlling the dispensing of gasoline from a dispenser comprising:
    (a) a selectively operable hand switch for setting, by predetermined increments, a predetermined dollar amount therein indicated by a corresponding electrical condition;
    (b) counting stepping switches adapted to be coupled to a dispenser for counting by said predetermined increment the dollar amount dispensed thereby, said dollar amount being indicated by a corresponding electrical condition;
    (c) signal producing means coupled to said hand switch and to said counting stepping switches for producing a permissive signal in response to said electrical condition of said hand switch and said electrical condition of said counting stepping switches being unequal and for producing a blocking signal in response to said electrical condition of said hand switch and said electrical condition of said counting stepping switches being equal;
    (d) control means coupled to said signal producing means and adapted to be coupled to said dispensing means for rendering said dispensing means operative in response to said permissive signal and for rendering said dispensing means inoperative in response to said blocking signal;
    (e) and means coupled to said control means for selectively rendering said dispensing means operative independently of said signal producing means.

2. The apparatus of claim 1 wherein said predetermined increment is one cent.

3. The apparatus of claim 1 and further comprising means for selectively connecting said apparatus to one of a plurality of dispensers.

4. Apparatus for remotely controlling the dispensing of gasoline from one of a group of selectable dispensers comprising:
    (a) three selectively operable hand switches for respectively setting a predetermined dollar amount, a predetermined ten cent amount, and a predetermined one cent amount therein, said switches indicating said predetermined amounts by corresponding electrical conditions therein;
    (b) counting apparatus having a dollar counter, a ten cent counter, and a one cent counter, said counters being adapted to be selectively coupled to said one dispenser to receive signals therefrom in one cent increments and to count said signals, said counted signals being indicated by corresponding electrical conditions therein;
    (c) signal producing means coupled to said counters and to said hand switches for producing a permissive signal in response to said electrical conditions in said dollar, ten cent, and one cent counters differing from said electrical conditions in said dollar, ten cent, and one cent hand switches, and for producing a blocking signal in response to said electrical conditions in said dollar, ten cent, and one cent counters being the same as said electrical conditions in said dollar, ten cent, and one cent switches respectively;
    (d) means coupled to said signal producing means and adapted to be coupled to said one dispenser for rendering said one dispenser operative in response to said permissive signal, and for rendering said one dispenser inoperative in response to said blocking signal;

(e) means adapted to be coupled to each of said dispensers for producing said one cent increment signals to be applied to said counting apparatus;

(f) and means coupled to said operative and inoperative rendering means for selectively causing said one dispenser to be operative independently of said signal producing means.

5. The apparatus of claim 4 and further comprising means coupled to said counting apparatus for visually displaying the count in each of said counters.

6. The apparatus of claim 4 wherein said means for producing said one cent increment signals is coupled to the means in said dispenser that produces a visual dollar and cent display.

7. The apparatus of claim 4 wherein said means for selectively causing said one dispenser to be operative comprises means for selectively causing said one dispenser to be inoperative.

References Cited

UNITED STATES PATENTS

| | | | |
|---|---|---|---|
| 2,784,874 | 3/1957 | Harper | 222—19 X |
| 3,138,289 | 6/1964 | Jones et al. | 222—20 |
| 3,207,370 | 9/1965 | Bateman | 222—26 |
| 3,260,409 | 7/1966 | Benham | 222—20 |

STANLEY H. TOLLBERG, *Primary Examiner.*